(12) United States Patent
Hua et al.

(10) Patent No.: US 9,160,257 B2
(45) Date of Patent: Oct. 13, 2015

(54) SOFT STARTER SYSTEM AND METHOD OF OPERATING SAME

(71) Applicant: Eaton Corporation, Cleveland, OH (US)

(72) Inventors: Yahan Hua, Shanghai (CN); Dongxiao Wu, Shanghai (CN); Bruno Patrice-Bernard Lequesne, Menomonee Falls, WI (US); David Lee Klapstein, Burlington, WI (US); Steven Andrew Dimino, Wauwatosa, WI (US); Kaijam M. Woodley, Brown Deer, WI (US)

(73) Assignee: Eaton Corporation, Cleveland, OH (US)

(*) Notice: Subject to any disclaimer, the term of this patent is extended or adjusted under 35 U.S.C. 154(b) by 3 days.

(21) Appl. No.: 14/139,380

(22) Filed: Dec. 23, 2013

(65) Prior Publication Data

US 2015/0180377 A1    Jun. 25, 2015

(51) Int. Cl.
   *H02P 1/16* (2006.01)
   *H02P 1/26* (2006.01)

(52) U.S. Cl.
   CPC ......................................... *H02P 1/26* (2013.01)

(58) Field of Classification Search
   CPC .................................... H02P 1/26; H02P 1/28
   USPC .......................................... 318/778, 767, 727
   See application file for complete search history.

(56) References Cited

U.S. PATENT DOCUMENTS

| | | | |
|---|---|---|---|
| 3,838,322 A | 9/1974 | Greenwell | |
| 3,866,097 A | 2/1975 | Anzai et al. | |
| 3,876,918 A | 4/1975 | Komuro et al. | |
| 3,935,518 A | 1/1976 | Yatsuk et al. | |
| 4,052,651 A | 10/1977 | Kamaike | |
| 4,482,853 A * | 11/1984 | Bhavsar | 318/778 |
| 5,272,428 A | 12/1993 | Spiegel et al. | |
| 5,652,485 A | 7/1997 | Spiegel et al. | |
| 5,774,630 A | 6/1998 | Lee et al. | |
| 6,047,275 A | 4/2000 | Jaremko et al. | |
| 6,208,111 B1 * | 3/2001 | Williams | 318/778 |
| 6,414,463 B1 | 7/2002 | Griepentrog et al. | |

(Continued)

OTHER PUBLICATIONS

Sirius Soft Starter 3RW44 Manual, Siemens, Oct. 2010, pp. 5-1-5-5.

(Continued)

*Primary Examiner* — David S Luo
(74) *Attorney, Agent, or Firm* — Ziolkowski Patent Solutions Group, SC

(57) ABSTRACT

A system and method for automatically defining and tuning operating parameters for a motor control device with minimal or no operator input is disclosed. The system includes a motor control device electrically connectable to an AC motor and a controller that is programmed to define a motor start-up function based on a rated current of the motor, the motor start-up function comprising an initial torque factor and an initial ramp time. The controller also triggers switching devices of the motor according to the motor start-up function to inject current into the motor during a first trial run, monitors operating conditions of the motor and motor control device during the first trial run, modifies the motor start-up function based on the monitored operating conditions, and triggers the plurality of switching devices according to the modified motor start-up function to inject current into the motor during a subsequent trial run.

22 Claims, 8 Drawing Sheets

(56) References Cited

U.S. PATENT DOCUMENTS

| | | | |
|---|---|---|---|
| 6,420,848 B1 | 7/2002 | Gritter et al. | |
| 6,594,592 B1 | 7/2003 | Griepentrog et al. | |
| 6,757,665 B1 | 6/2004 | Unsworth et al. | |
| 6,781,342 B2 * | 8/2004 | Tolbert et al. | 318/784 |
| 6,914,398 B2 | 7/2005 | Ohlsson et al. | |
| 7,791,307 B2 | 9/2010 | Bilac et al. | |
| 7,952,318 B2 | 5/2011 | Lu et al. | |
| 8,138,702 B2 | 3/2012 | Nolemo et al. | |
| 8,203,298 B2 | 6/2012 | Lu et al. | |
| 8,487,561 B2 | 7/2013 | Balcon et al. | |

OTHER PUBLICATIONS

S811 Soft Starter User Manual, Eaton Cutler-Hammer IT, Nov. 2006, Revision 6.

S811 Soft Starter Installation and Setup Guide, Eaton Cutler-Hammer IT, Nov. 2006.

Deleroi et al., "Analysis and Application of Three-Phase Induction Motor Voltage Controller with Improved Transient Performance," IEEE Transactions on Industry Applications, vol. 25, No. 2, Mar./Apr. 1989, pp. 280-286.

Sastry et al., "Optimal Soft Starting of Voltage-Controller-Fed IM Drive Based on Voltage Across Thyristor," IEEE Transactions on Power Electronics, vol. 12, No. 6, Nov. 1997, pp. 1041-1051.

Zenginobuz et al., "Performance Optimization of Induction Motors During Voltage-Controlled Soft Starting," IEEE Transactions on Energy Conversion, vol. 19, No. 2, Jun. 2004, pp. 278-288.

Oliveira et al., "Direct Torque Control of Induction Motor Soft Starting," IEEE Power Electronics Conference, 2009, COBEP '09, pp. 512-516.

Nied et al, "Soft Starting Induction Motor with Torque Control," IEEE Transactions on Industry Applications, vol. 46, No. 3, May/Jun. 2010, pp. 1002-1010.

Novotny et al., "Vector Control and Dynamics of AC Drives," Oxford Science Publications, Clarendon Press, Novotny and Lipo, 1996, p. 77.

Prasad et al., "Rapid Prototyping Tool for a Fuzzy Logic Based Soft-Starter," IEEE, 1997, pp. 877-880.

Li et al., "Design of Intelligent Soft-Start Controller for Induction Motor," Proceedings of the Third International Conference on Machine Learning and Cybernetics, Shanghai, Aug. 26-29, 2004, pp. 908-912.

Filippetti et al., "Recent Developments of Induction Motor Drives Fault Diagnosis Using AI Techniques," IEEE Transactions on Industrial Electronics, vol. 47, No. 5, Oct. 2000, pp. 994-1004.

Yufang et al., Research and Design of an Intelligent Liquid-state Softstarter, 2010 International Conference on Electrical and Control Engineering, pp. 1562-1565.

* cited by examiner

SOFT STARTER SYSTEM AND METHOD OF OPERATING SAME

BACKGROUND OF THE INVENTION

Embodiments of the invention relate generally to alternating current (AC) motors and, more particularly, to an automated system and method for defining operating parameters for a soft starter.

Motor soft starters are devices that control transmission of voltage and current from an AC power source to an induction motor. Soft starters are configured to limit the transient voltages and current inrush to the induction motor during start-up, resulting in a "soft" motor starting. In operation, power from the AC source is passed through switching devices in the soft starter, such as a pair of anti-parallel or back-to-back solid state switches in the form of thyristors or silicon controlled rectifiers (SCRs), to control the current flow and, in turn, the terminal voltages of the induction motor.

In general, the soft starter temporarily reduces torque in a powertrain of the motor during startup via selective control of the thyristors. This reduction allows for reduced stresses on the motor and electrical network, which increases the life of the system. The thyristors are controlled to turn on at a given angle, γ, as measured when the voltage becomes positive. The resulting currents flow through the given phases until they reach zero, at which point the thyristors turn off. This pattern creates a "notch" in the voltage. The larger the notch width, the smaller the rms voltage applied to the motor. Since torque is a function of the square of the rms voltage, the larger the notch width, the smaller the torque. If the notch width is zero, full voltage is applied to the motor. Typically, the soft starting process lasts a few seconds, at the end of which the system reaches its final speed and contactors are closed to bypass the soft starter.

In order to operate typical motor soft starters, the operator must manually enter multiple operating parameters into a user interface to define the turn on angle of the thyristor and resulting notch width profile of the soft starter throughout the soft starting process. These operating parameters include a suitable starting time, a current limit, an initial torque, a torque limit, a notch width, and a kick-start duration and kick-start torque (if applicable). Typically, operating parameters are manually selected based on suggestions in a user manual or based on input from field engineers. Correctly setting the parameters for various motors and loads that result in reliable smooth starts based on this trial-and-error parameter selection can be difficult since machine and load evaluation must be taken into account to determine a correct starting pattern.

Accordingly, it would be desirable to have a system that automatically defines the operating parameters for a soft starter with minimal user input. It would also be desirable for such a soft starter system to recalculate and adjust the operating parameters over time to increase the probability of a motor start and account for load changes over time.

BRIEF DESCRIPTION OF THE INVENTION

The present invention provides a system and method for automatically defining and tuning operating parameters for a motor soft starter.

According to one aspect of the invention, a motor control device that is electrically connectable to an AC motor includes a plurality of switching devices comprising at least one switch corresponding to a respective phase of the AC motor and a controller. The controller is programmed to define a motor start-up function based on a rated current of the AC motor, the motor start-up function comprising an initial torque factor and an initial ramp time, and trigger the plurality of switching devices according to the motor start-up function to inject current into the AC motor during a first trial run. The controller is also programmed to monitor operating conditions of at least one of the AC motor and the motor control device during the first trial run, modify the motor start-up function based on the monitored operating conditions, and trigger the plurality of switching devices according to the modified motor start-up function to inject current into the AC motor during a subsequent trial run.

According to another aspect of the invention, a method for controlling a AC motor includes providing a motor control device having a plurality of switching devices to condition voltage and current to the AC motor, providing a sensor system to sense operating conditions of the motor control device and the AC motor, and coupling the motor control device between an AC power source and the AC motor. The method also includes automatically generating a first notch width function from an initial set of operating parameters, controlling the plurality of switching devices according to the first notch width function during a first motor start-up attempt, automatically modifying the first notch width function based on feedback received from the sensor system during the first motor start-up attempt, and controlling the plurality of switching devices according to the modified notch width function during a second motor start-up attempt.

According to yet another aspect of the invention, a soft-starter is provided to control transmission of voltage and current from an AC power source to an induction motor. The soft-starter includes a plurality of supply lines, each supply line corresponding to a phase in the induction motor and a plurality of solid-state switches comprising at least one solid-state switch located on each of the plurality of supply lines to condition a motor line voltage and a phase current to the induction motor. The soft-starter also includes a processor programmed to trigger the plurality of solid-state switches according to a motor start-up function and automatically modify at least one operating parameter of the motor start-up function absent operator input. The processor is further programmed to automatically update the motor start-up function using the modified at least one operating parameter and trigger the plurality of solid-state switches according to the updated motor start-up function.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The embodiments of the invention set forth herein relate to a system and automated method for generating and tuning a start-up profile or notch width function for a motor soft starter with minimal user input. While embodiments of the invention are described herein as being used in connection with a multi-phase AC power source, one skilled in the art will recognize that embodiments of the invention are applicable to single-phase AC power sources.

Figure 1:
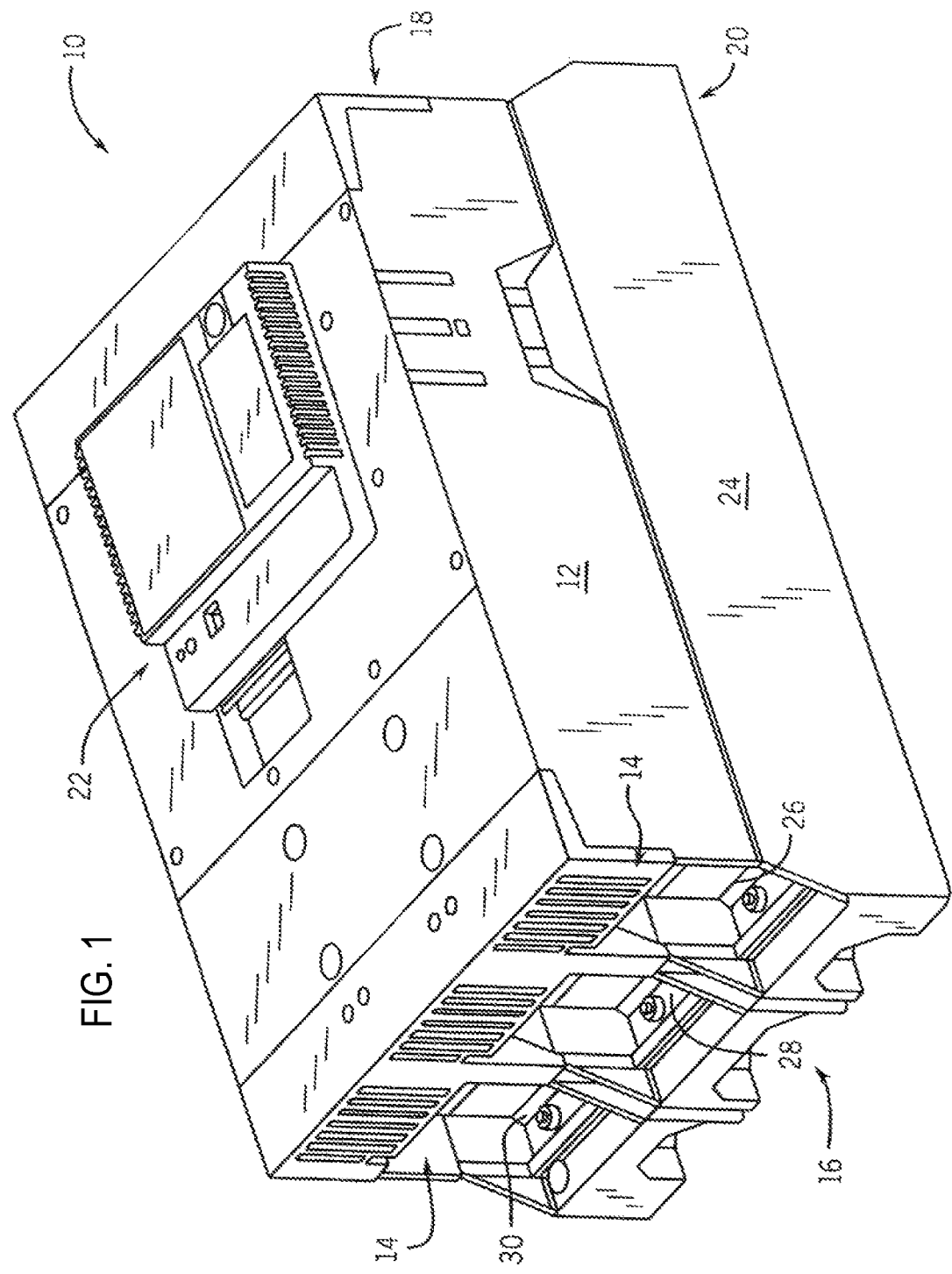
FIG. 1 is a perspective view of a soft starter for use with embodiments of the present invention.

Referring to FIG. 1, a motor control device 10 is shown that can be used in implementing embodiments of the invention set forth below. In an exemplary embodiment of the invention, motor control device 10 comprises a soft starter configured to limit the transient voltages and current to a multi-phase AC motor during motor start-up, and will be referred to such herein. Soft starter 10 includes a cover assembly 12 having air inlets 14 on a motor connection end, or load end 16. Similar air outlets 18 are located on a power source end, or line end 20 of the soft starter 10. The cover assembly 12 also houses an electronic controller 22. Soft starter 10 also includes a base assembly 24 to house each of switch assemblies 26, 28, 30. Each of the switch assemblies 26-30 is identical in construction for a given soft starter 10 and corresponds to a given phase of a multi-phase input to the multi-phase AC motor.

It is recognized that soft starter 10 illustrated in FIG. 1 is merely an example of a soft starter architecture/structure that may used in implementing embodiments of the invention, and that other various soft starter architectures/structures used or required to meet specific application requirements are also understood to be included within the scope of the invention. For example, a range of open chassis soft starter configurations could be used in implementing embodiments of the invention rather than the housed soft starter shown in FIG. 1.

Figure 2:
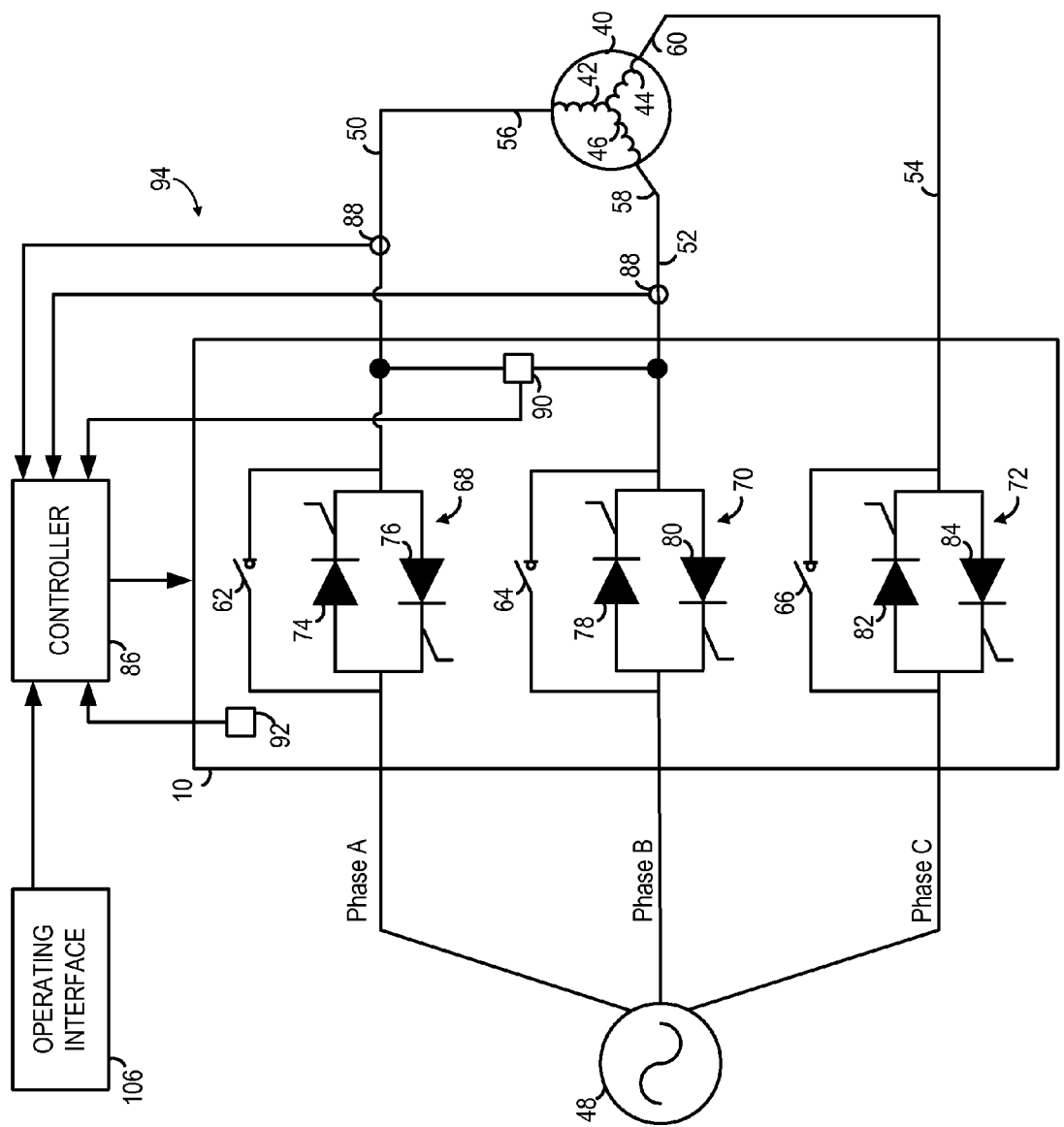
FIG. 2 is a schematic view of an AC motor system incorporating a soft starter according to an embodiment of the invention.

Referring to FIG. 2, a three-phase, induction motor or AC motor 40 is schematically shown according to an embodiment of the invention, and is generally designated by the reference numeral 40. As is conventional, AC motor 40 is represented as three stator windings 42, 44, 46. In this case, AC motor 40 is shown connected in a wye-arrangement. It can be appreciated that AC motor 40 may alternatively, and according to the equivalents of the invention, be connected in a delta arrangement without deviating from the scope of the invention. Stator windings 42-46 of AC motor 40 are operatively connected to an AC power source 48 through corresponding multi-phase supply lines 50, 52, 54, at motor terminals 56, 58, 60.

In the embodiment shown in FIG. 2, soft starter 10 is connected between AC power source 48 and AC motor 40 and is located outside the AC motor 40 (i.e., outside the delta). Alternatively, soft starter 10 may be positioned inside the AC motor 40 (i.e., inside the delta). As one skilled in the art will recognize, the embodiments described herein may be adapted for such a configuration.

Soft starter 10 is configured to limit the transient voltages and current to AC motor 40 during start-up, resulting in a "soft" motor starting. The basic structure of soft starter 10 is shown in FIG. 2 (i.e., circuitry of the soft starter) as including a contactor 62, 64, 66 corresponding to each supply line 50-54 or each phase of the supply power. Soft starter 10 also includes a switching device 68, 70, 72 on each supply line 50-54. In an exemplary embodiment each switching device 68-72 is formed of a pair of anti-parallel switches, such as solid-state switches in the form of thyristors or silicon controlled rectifiers (SCRs), to control the current flow and, in turn, the terminal voltages of the motor 40. As shown, switch pair 68 includes thyristors 74, 76 which are opposite in polarity and are connected in parallel for supply line 50. Likewise, switch pair 70 includes thyristors 78, 80, which are opposite in polarity and are connected in parallel for supply line 52. Finally, switch pair 72 includes thyristors 82, 84, which are opposite in polarity and are connected in parallel for supply line 54. In a preferred embodiment, thyristors 74, 78, 82 are forward conducting and thyristors 76, 80, 84 are backward conducting.

While each phase is shown as including a pair of thyristors 74-84, it is also envisioned that soft starter 10 could have a pair of thyristors on only one or two supply lines (e.g., only supply line 50). Additionally, it is also recognized that, for a specified supply line, a thyristor could be arranged in parallel with a diode rather than another thyristor. In any of the embodiments described above a thyristor 74-84 on a single supply line can be controlled to distort the input voltage and current received by AC motor 40, as described below.

Also included in soft starter 10 is a controller or processor 86 configured to control operation of thyristors 74-84 via the transmission of gate drive signals thereto, as well as to control opening and closing of contactors 62-66. During start-up/ramp-up of AC motor 40 (and similarly during a ramp-down), soft starter 10 operates in a "start-up" or "ramping" mode, during which controller 86 causes one or more of contactors 62-66 corresponding to supply lines 50-54 to open such that the power from AC source 48 passes through thyristor pairs 68-74, thus controlling the current flow (and therefore the voltage) applied to the AC motor 40. Subsequent to start-up of AC motor 40, the soft starter 10 enters a "bypass" mode in which controller 86 causes the contactor 62-66 on each supply line 50-54 to close, so as to bypass the switching devices 68, 70, 72 and minimize power dissipation. The bypass mode thus is considered the "normal" mode of operation for the soft starter 98 and AC motor 40.

During operation of soft starter 10, ongoing processing occurs within the soft starter 98 in which measurements and/or calculations of the current being drawn by AC motor 40 are performed. Data for these measurements and/or calculations is acquired from a set of current sensors 88. In one embodiment, these measurements and/or calculations are performed at approximately every half cycle of the input line frequency. However, these measurements and/or calculations may be performed more or less frequently in alternative embodiments. In the illustrated embodiment, the set of current sensors 88 includes current sensors in two of the three phases. Alternative embodiments may include a respective current sensor for each of the three phases or a single sensor used in just one of the phases. Soft starter 10 is also equipped with one or more voltage sensors 90 that measures the voltage across the switching devices. While only one voltage sensor is illustrated in FIG. 2, alternative embodiments may include one or more additional voltage sensors. A temperature sensing unit 92, comprising one or more temperature sensors, is also provided to monitor the temperature of soft starter 98. Together, the current sensor, voltage sensor(s), and temperature sensing unit (if used) form a sensor system 94 that provides feedback to controller 86.

Figure 3:
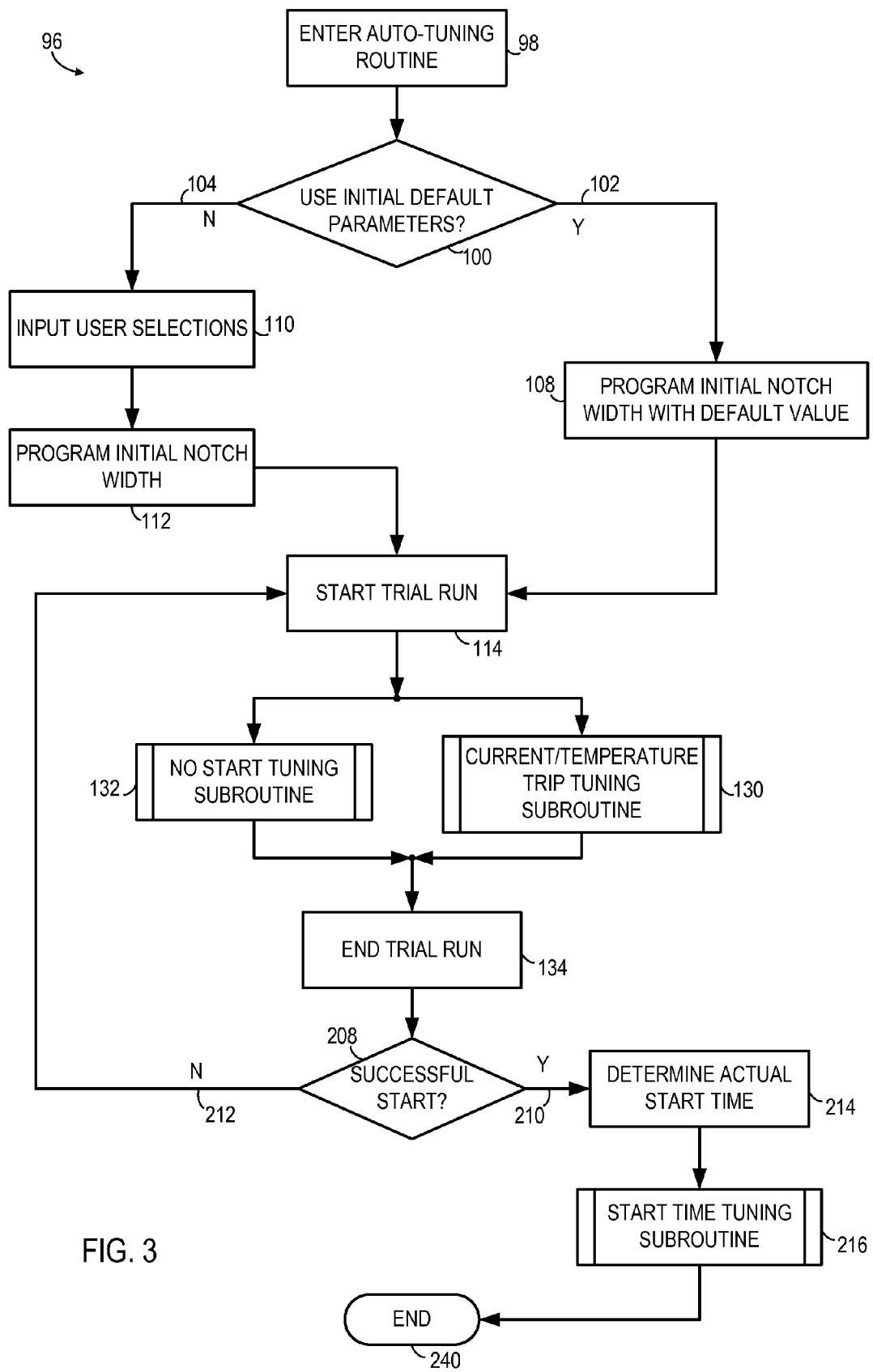
FIG. 3 is a flowchart illustrating a technique for determining and modifying soft starter operating parameters according to an embodiment of the invention.

An automated technique 96 for determining and tuning operating parameters that define a motor start-up function or notch width profile for operating soft starter 10 is illustrated in FIG. 3, according to an embodiment of the invention. In general, technique 96 defines a first notch width or turn-on angle, γ, as a function of time, modifies this selection until an appropriate or acceptable motor start is obtained, monitors behavior of the motor start-up system over time, and continuously adjusts the selection based on the monitored behavior to maintain start quality. Because technique 96 operates with little to no operator input and automatically tunes the motor start-up profile for subsequent motor starts based on monitored operating conditions of the motor and soft starter, technique 96 generates a robust and reliable motor start-up profile.

Technique 96 performs the automated tuning of the motor start-up profile or notch width profile in a number of steps that can generally be divided into four main stages: an initial stage for system set-up, a second stage wherein initial operating parameters are selected, a third stage that includes a search for a set of operating parameters for a successful first run or motor start-up (that is, a run in which final motor speed is reached, albeit possibly not smoothly or optimally), and a final stage that includes a search for a set of operating parameters for a smooth run or motor start-up (that is, a run in which final motor speed is reached smoothly or optimally). While the various steps of technique 96 are described herein as falling within four general stages, the division of the steps of technique 96 into a certain number of defined stages is done herein to facilitate explanation of technique disclosed herein. One skilled in the art will recognize that the steps of technique 96 may be divided into more or less than four stages in alternative embodiments without deviating from the general scope of the invention.

The system set-up stage of technique 96 begins at step 98 when the soft starter controller, such as controller 86 of FIG. 2, enters the auto-tuning routine in which soft starter operating parameters will be automatically determined and tuned. At step 100 technique 96 determines whether to use the initial default operating parameters for the soft starter. These default parameters may include, for example, manufacturer default settings for notch width and ramp time and/or a minimum full load amperes (FLA) value determined from the low end of the horsepower range of the given soft starter. The full load amperes (FLA) value is the rated value of current for the motor, that provides rated torque at rated speed. The decision to use the initial default operating parameters, 102, or not use the initial default operating parameters, 104, may be made as a result of a user input on an operating interface of the soft starter, such as operating interface 106 (FIG. 2). Alternatively technique 96 may be programmed to automatically proceed using default parameters and absent any operator input. If technique 96 is to proceed with using the initial default operating parameters 102, technique 96 programs controller 86 to operate the soft starter according to a motor start-up profile defined by a first notch width profile based on a default value at step 108.

Alternatively, if technique 96 is to proceed without using the initial default operating parameters 104, technique 96 receives one or more user input selections at step 110. In a preferred embodiment, the user input selection is a single numerical value that corresponds to the full load amperes (FLA) of the motor. Alternatively, the user input selection may include one or more inputs related to motor nameplate data and, optionally, one or more additional user selections as described below. These user input selections may be made following prompts provided to the user on the operating interface 106, according to one embodiment. The motor nameplate data may include one or more of the following: motor power rating, a rated current or full load amperes (FLA), rated power factor, rated voltage, or rated efficiency, as examples.

Optionally, the user may input one or more additional inputs at step 110, including an expected start time for the motor (defined herein as t_user_start), a user-defined current limit value, and information related to the type of application or load for which the soft starter is used. Non-limiting examples of such applications or loads include a pump, fan, centrifuge, conveyor belt, crusher, high-inertia load, and the like. The user may input this information through a drop-down menu or other selection tool provided on the operating interface 106 that permits the user to select one or multiple application entries, such as, for example "pump" and "high-inertia load".

After the user input selections are received, technique 96 enters the second stage of the auto-tuning routine and defines a first notch profile or initial motor start-up profile for a trial run by selecting the first notch width or turn-on angle, γ, as a function of time at step 112 based on the user input selections.

Figure 4:
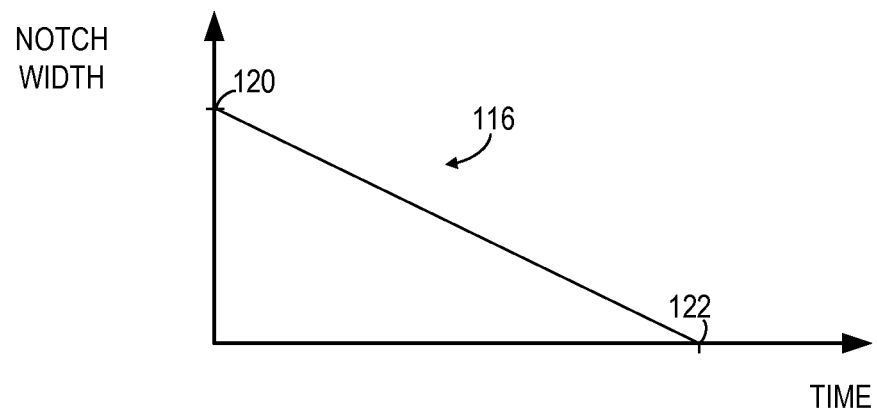
FIG. 4 is an exemplary notch width function for starting a motor without a kick-start, according to an embodiment of the invention.
Figure 5:
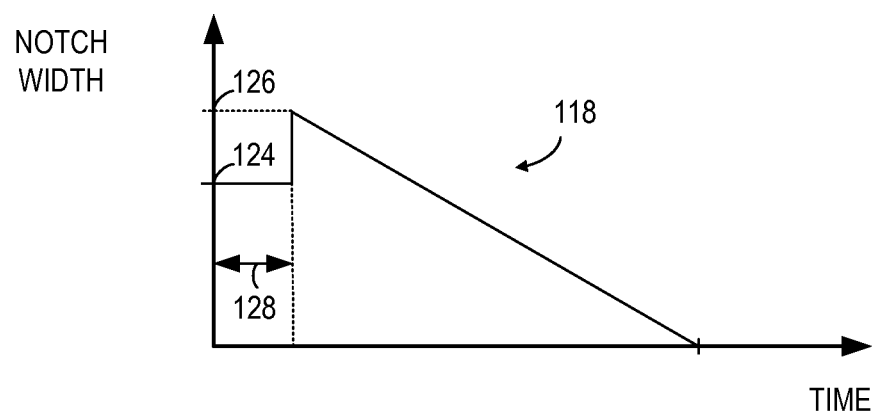
FIG. 5 is an exemplary notch width function for starting a motor with a kick-start, according to an embodiment of the invention.

Technique 96 initiates an initial or first trial run at step 114. The operating parameters of the first trial run are determined based on the first notch width profile programmed either at step 108 or step 112. Two exemplary first notch width profiles are illustrated in FIG. 4 and FIG. 5. FIG. 4 illustrates a general linear notch width profile 116; FIG. 5 illustrates a notch width profile for a kick-start application 118. Referring first to FIG. 4, the operating parameters of the trial run are initially defined as a ramp function that begins at an initial notch width 120 and that decreases linearly to zero at time point 122 (defined herein as t_ramp). In the case of a kick-start application as illustrated in FIG. 5, the initial kick-start torque factor or initial kick-start notch width 124 is selected as a value less than an initial torque factor or initial ramp notch width 126. The soft starter operates at the initial kick-start notch width 124 for a kick-start duration 128, after which the notch width is increased to the initial ramp notch width 126.

According to one embodiment, the initial notch width 120 or initial ramp notch width value of the ramp function 126 is defined according to:

$$\text{Notch Width} = \text{maxNotch} - (k\_torque*(\text{maxNotch} - \text{minNotch})/100) \quad \text{(Eqn. 1)},$$

where maxNotch and minNotch are predefined maximum and minimum notch angles and k_torque is defined as a percentage value (e.g., 50%) that indirectly determines the initial torque. The variable k_torque is referred to hereafter as an initial torque factor. In one embodiment, the initial torque factor is selected as percentage value between approximately 45-50%.

If the operator entered an expected start time value, t_user_start, into the operator interface at step 110, the initial ramp time, t_ramp, is initially defined based on t_user_start. In one embodiment t_ramp is defined as a predefined multiple, x, of t_user_start, according to t_ramp=x(t_user_start). The predefined multiple, x, is a scalar value such as, for example, 1 or 1.5 or 2. Alternatively, if the user did not enter an expected start time value at step 110, technique 96 uses a default value for t_ramp. This default value may vary based on the type of start, which may be determined based on a received user input indicating the type of application or load for which the soft starter is used, if available. For example, the default value of t_ramp may be set as 60 seconds in a normal start application or 180 seconds in an extended start application, such as an application associated with a high inertia load, centrifuge, or similar system.

Referring again to FIG. 3, after the initial operating parameters are determined for the motor start-up profile of the trial run, technique 96 enters the third stage of the auto-tuning routine during which a set of operating parameters for a first successful run or start are sought out while running a set of tuning subroutines at steps 130 and 132. During steps 130, 132 technique 96 attempts a motor start up by operating the soft starter according to the operating parameters defined at step 108 or step 112. During the duration of this start-up attempt, operating conditions of the motor and soft starter, such as voltage, current, and temperature, are monitored and corrective actions are taken, if appropriate, based on the monitored operating conditions, as described below. Based on the outcome of the subroutines operating at steps 130 and 132, one or more of the operating parameters of the motor start-up may be modified for use in the subsequent trial run or subsequent start-up attempt. The trial run ends at step 134.

According to one embodiment, the duration of this first or initial trial run is set at a predefined value, such as 10 seconds for a normal start up application or 60 seconds for an extended start application. These trial run duration values are provided as examples only and other default values may be used within the scope of the invention. Alternatively, the trial run duration time may be defined as a function of the power rating of the motor or load. For example, for a low power motor, the trial run duration may be defined as a shorter time period, such as 10 seconds, extending proportionally to a longer time period, such as 15 seconds, for a high power motor. As yet another alternative, the duration of the trial run may be defined as being equal to or a predefined fraction of the user-provided start time, t_user_start.

Figure 6:
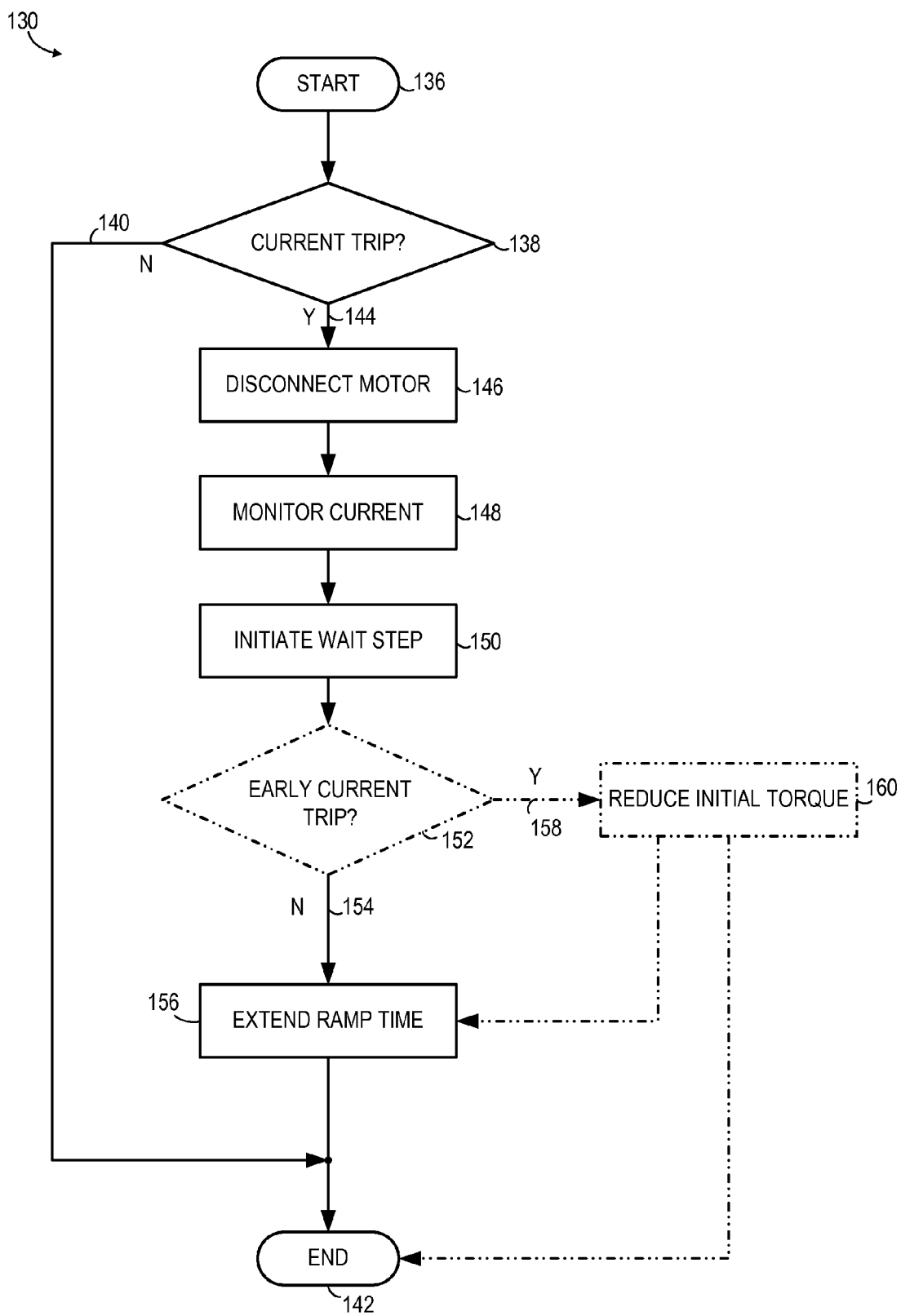
FIG. 6 is a flowchart illustrating a subroutine of the technique of FIG. 3 that tunes operating parameters of a notch width function based on a monitored current value, according to an embodiment of the invention.

Throughout the duration of the trial run, technique 96 runs a current trip tuning subroutine 130, the details of which are illustrated in FIG. 6. In general, the current trip tuning subroutine 130 operates to lengthen the ramp time and, in cases where an early trip occurs, reduce the initial torque factor of the notch profile used in a subsequent trial run. Tuning subroutine 130 starts at step 136 and monitors for a current trip at step 138 using current sensors 88 (FIG. 2). A current trip is identified if the monitored current exceeds a current threshold value. In one embodiment, the current threshold value is set as a multiple of the FLA, such as, for example, three times the FLA or four times the FLA. Alternatively, the current limit may be input by an operator at step 110. If the current does not exceed the current threshold during the trial run 140, tuning algorithm subroutine 130 ends at step 142. This current trip value is an operating parameter for soft starter set-up, which may be modified by the user depending on a number of factors. Other, generally higher, current thresholds are generally used for protection, to operate circuit breakers and other hardware. Such higher current thresholds are not part of technique 96 except to interrupt it in case of a fault, as is done in the art to protect electrical circuits and machinery.

If, on the other hand, the monitored current is greater than the current threshold value, a trip occurs 144 and the motor is disconnected at step 146 and the motor begins to coast down to a stop. According to one embodiment, current trip tuning subroutine 130 identifies a current trip 144 if the monitored current is greater than the current threshold value over a certain duration of time, where the duration may be defined as a fraction of a second, such as 0.2 or 0.5 seconds, in such a way as to avoid nuisance interruption due to noise or other spurious event. Disconnection of the motor is accomplished by discontinuing the triggering or firing of switching devices 68-72, thus electrically isolating the motor terminals from the line voltage. At step 148 a representative value of voltage is measured across the motor terminals at the time of disconnect and during the time period as the motor slows or coasts to a stop. The representative value may be a peak value, or an rms value, for instance. The monitored representative value of voltage is used to determine the speed of the motor. The motor speed may be used as a factor for determining the time needed to wait before a restart, as explained in more detail below. Additionally, the monitored motor speed contains information concerning the system load and inertia, which may be used to generate refined operating parameters, for diagnosis and debugging, and other functions. During step 150 technique 96 maintains a wait step. The wait step continues until the motor has stopped, which can be determined in a number of ways, such as a set time (such as 1 minute), or extrapolated from monitoring the representative value of motor voltage. The duration of the wait step can optionally be lengthened based on input from temperature sensing unit 92, for instance until the temperature reading is below a threshold devised for safe subsequent operation of the unit. Further, the wait step can include an optional input from the user, such that the restart occurs only with the acquiescence of the user.

Figure 7:
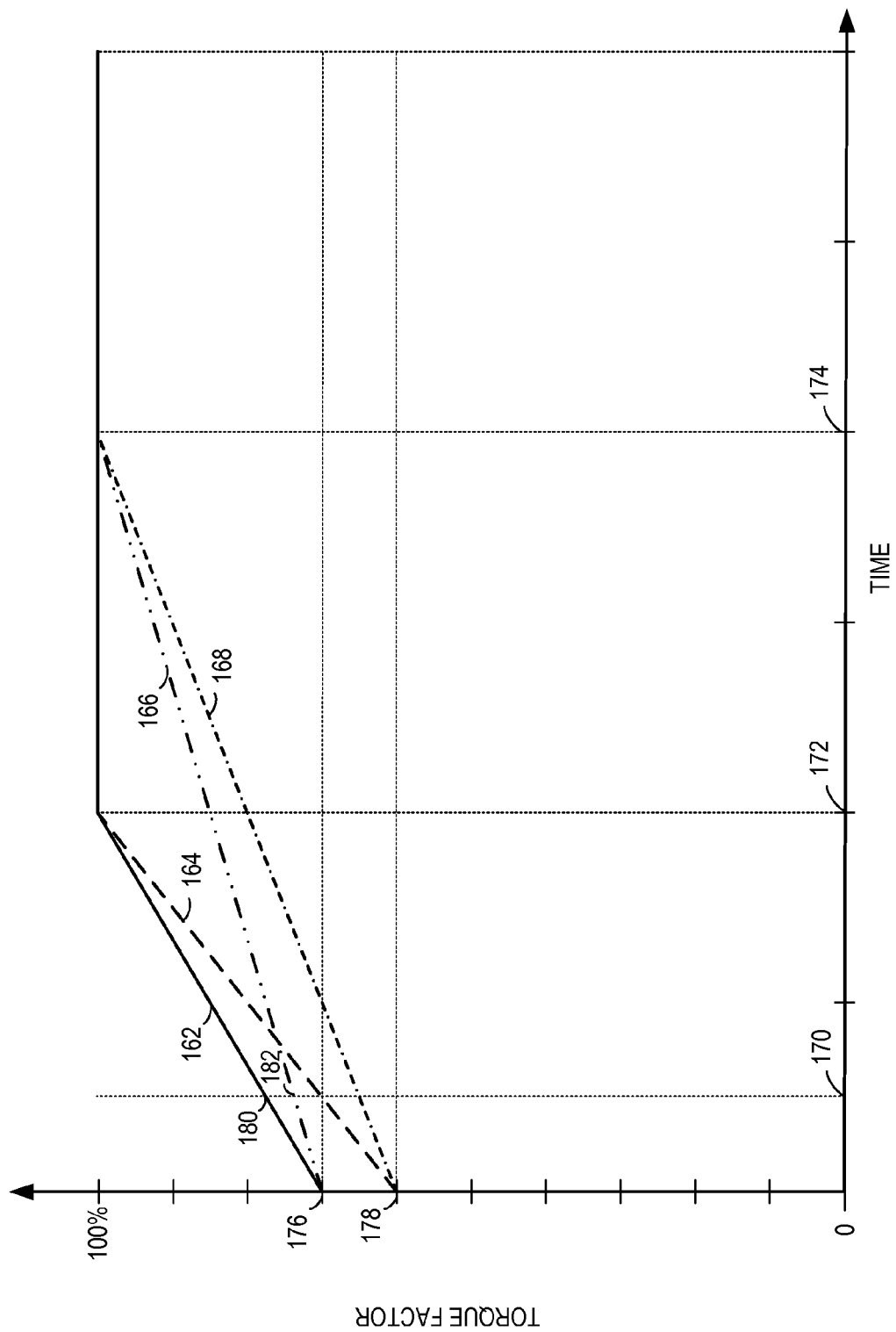
FIG. 7 illustrates exemplary plots of torque factor over time used to start a motor before and after an overcurrent condition has been detected, according to various embodiments of the invention.

Optionally, at step 152 (shown in phantom), technique 96 determines whether the current trip was an "early trip." A current trip may be determined to be an "early trip" if the trip occurs before a first time threshold in the trial run or within a predetermined time period following initiation of the trial run, such as, for example, within the first second of the trial run. If the current trip did not occur within the predetermined time period 154 (that is, the current trip occurs after the first time threshold), technique 96 proceeds directly to step 156 to extend the ramp time. On the other hand, if the current trip did occur before the first time threshold in the trial run 158, the voltage was too high at the beginning of the start-up operation. To maintain the voltage near its initial value for a longer time period and prevent a current trip in a subsequent run, the initial torque may be reduced at optional step 160 (shown in phantom) and, optionally, the ramp time may be lengthened at step 152, as described in more detail with respect to FIG. 7. According to various embodiments, technique 96 may be configured to proceed to step 156 and extend the ramp time following step 160 or, alternatively, bypass step 160 and proceed directly to step 142.

At step 156, technique 96 extends the ramp time, t_ramp, for use in the next trial run. According to various embodiments, the ramp time, t_ramp, may be increased from the previous value by a predefined scalar value or multiplication factor according to a look-up table, as examples. Optionally, in extending the ramp time, technique 96 may take into account how long after the trial run was initiated that the trip occurred. If the trip occurred very soon after the trial run was initiated, such as, for example, within one second of initiating the trial run, technique 96 may also decrease the initial torque factor for the subsequent trial run. Similar to the ramp time, the amount of decrease in torque factor may be determined from a look-up table or according to a predetermined function. After the extended ramp time is determined, tuning algorithm subroutine 130 ends at step 142.

As explained above, after an overcurrent condition is detected as a result of the selected operating parameters for a given trial run, current trip tuning subroutine 130 may take a number of actions to modify the operating parameters of the start-up profile used for the subsequent trial run, namely lengthening the ramp time and/or reducing the initial torque. To illustrate these options in more detail, FIG. 7 includes an exemplary initial start-up profile 162 illustrated in terms of voltage (or torque factor) applied to the motor versus time for a first trial run and three exemplary start-up profiles 164, 166, 168 for a subsequent trial run after an overcurrent condition is detected as a result of an attempted motor start using initial start-up profile 162. Start-up profile 164 illustrates a case where the subsequent trial run is defined to have a reduced initial torque factor and the same ramp time as the first trial run. Start-up profile 166 defines a subsequent trial run having an increased ramp time from the first trial run, but where the initial torque factor remains unchanged. Start-up profile 168 illustrates a case where both the initial torque factor is reduced and the ramp time is increased between the first trial run and the subsequent trial run.

To determine which start-up profile to follow for the subsequent trial run, current trip tuning subroutine 130 determines when the trip occurred during previous trial run. If the trip did not occur early in the start-up attempt, such as after time 170, current trip tuning subroutine 130 increases the ramp time from time 172 to time 174 while maintaining the initial torque factor 176 for the subsequent trial run, as illustrated in start-up profile 166.

Because start-up profile 166 is only marginally below the initial start-up profile 162, merely increasing the ramp time may not be sufficient to prevent an overcurrent condition from occurring in the subsequent trial run if the current trip occurred early in the trial run. When an overcurrent condition is detected early on during the start-up attempt using initial start-up profile 162, such as prior to time 170, current trip tuning subroutine 130 may reduce the initial torque factor for the subsequent trial run, as illustrated by start-up profiles 164 and 168. Reducing the initial torque factor for the subsequent trial run reduces the voltage applied to the motor early on. In a preferred embodiment, subroutine 130 reduces the initial torque value 176 to a value decreased initial torque factor 178 while maintaining the initial ramp time 172. Alternatively, subroutine 130 may decrease the initial torque factor and also increase the ramp time from initial ramp time 172 to an increased ramp time 174, as illustrated in start-up profile 168.

According to one embodiment, in defining the initial torque factor and ramp time for the subsequent trial run after an early trip is detected, current trip tuning algorithm subroutine 130 is configured to determine the torque factor 182 at time 170 based on the slope of start-up profile 166 and compare the determined torque factor to the corresponding torque factor 180 at time 170 from the first or initial trial run 162. If torque factor 182 differs from torque factor 180 by more than a predetermined amount, such as 5%, current trip tuning algorithm subroutine 130 will select subsequent start-up profile 166 for the subsequent trial run. If torque factor 182 does not differ from 180 by more than the predetermined amount, current trip tuning algorithm subroutine 130 selects either start-up profile 164 or start-up profile 168 for the subsequent start up profile.

Optionally, current trip subroutine 130 may also be configured to monitor for a temperature trip or condition wherein the temperature of the soft starter as monitored by temperature sensing unit 92 (FIG. 2) exceeds a predetermined threshold value during operation. If such an overtemperature trip occurs, subroutine 130 may be further configured to disconnect the motor and adjust operating parameters in a similar manner as described above with respect to a current trip situation. In such instances, the wait step 150 may be maintained until the monitored soft starter temperature has reached an acceptable level (as indicated by feedback from temperature sensing unit 92).

Figure 8:
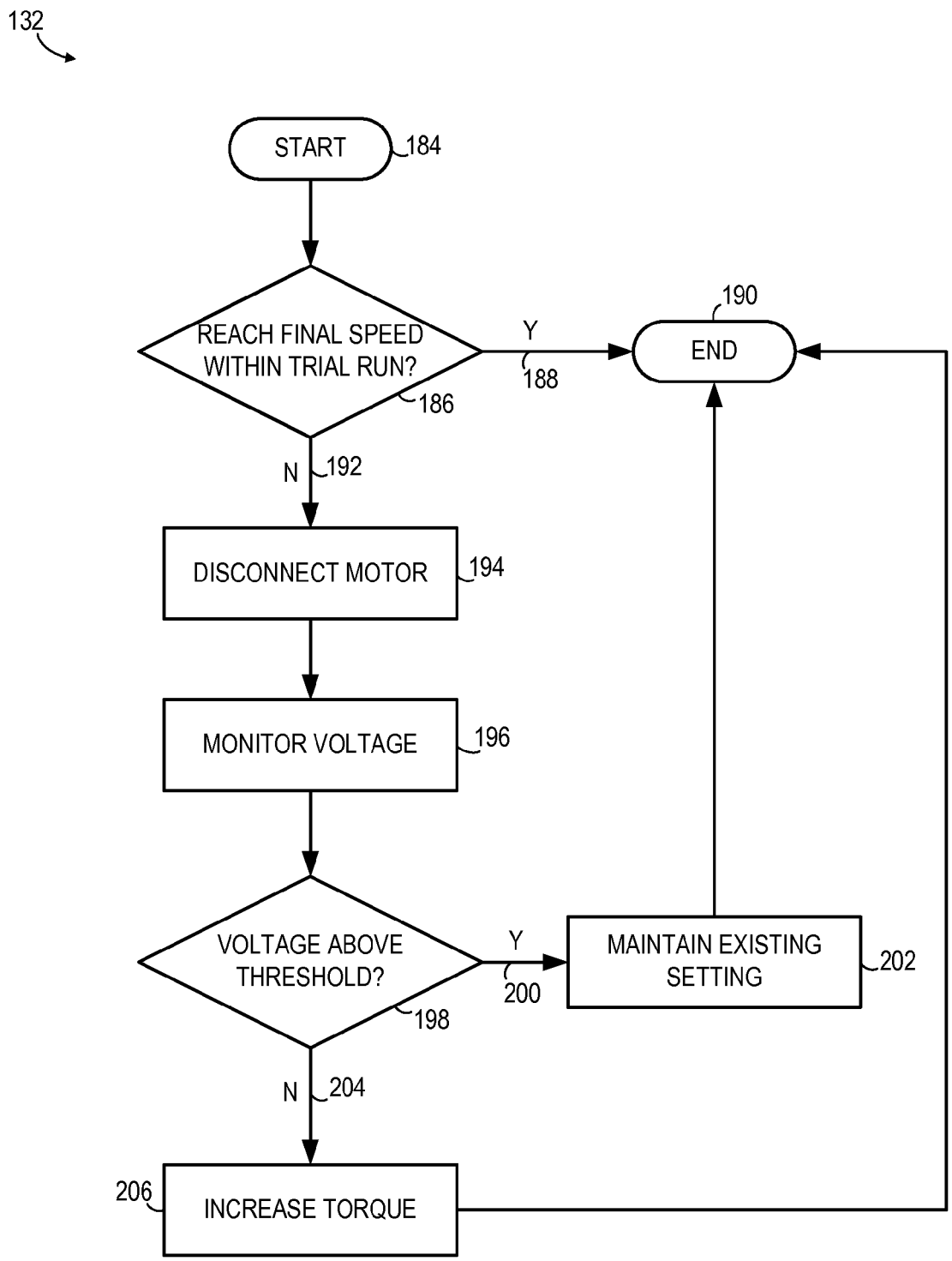
FIG. 8 is a flowchart illustrating a subroutine of the technique of FIG. 3 that tunes operating parameters of a notch width function based on a monitored motor speed at the end of a trial run, according to an embodiment of the invention.

During the trial run, technique 96 also operates a no start tuning subroutine 132, the details of which are illustrated in FIG. 8. Subroutine 132 begins at step 184 and determines whether the motor reached full operating speed during the time duration of the trial run at step 186. If the motor did reach full speed during the trial run 188, the no start tuning algorithm subroutine 132 ends at step 190. If, on the other hand, the motor did not reach full speed during the trial run 192, the motor is disconnected at step 194 at the end of the trial run duration and a representative value of motor voltage after the motor is disconnected is monitored at step 196.

At step 198 the monitored a representative value of motor voltage after the motor disconnect is compared to a threshold. In one embodiment, the threshold voltage value is selected as a percentage of the full line voltage. If the monitored motor voltage is greater than the threshold voltage value 200, the current value of the initial torque factor is maintained at its existing setting for a subsequent trial run at step 202. If the monitored motor voltage is less than the threshold voltage value 204, the initial torque factor is increased for the next trial run at step 206.

According to one embodiment, no start tuning algorithm subroutine 132 increases the initial torque factor at step 206 in accordance with a look-up table. An exemplary look-up table, TABLE 1, is provided below. TABLE 1 is merely an example of one possible combination of torque and kick start duration values and is not intended to limit the scope of the invention. As one skilled in the art will recognize, torque factor values and kick start duration, as well as the number of trial runs in a general operation mode and a kick start mode and prior to the indication of a flag may be varied based on a given application. As shown, the initial torque factor may be incrementally increased for a first number of trial run iterations by a predefined amount, such as, for example, an additional ten percent of the initial torque value without a kick start. If the motor does not start after the first number of trial run iterations, subroutine 132 may initiate a kick start operation and selectively change the initial torque, kick start duration, and/or initial ramp torque in subsequent trial runs if the motor does not start. If the motor does not start after a certain number of trial run iterations, subroutine 132 may be programmed to indicate a flag or overload condition at the end 190 of the subroutine.

TABLE 1

| Trial Run | Initial Torque Factor | Kick Start Duration | Initial Ramp Torque Factor |
|---|---|---|---|
| i = 1 | 50% | 0 | 0 |
| i = 2 | 60% | 0 | 0 |
| i = 3 | 70% | 0 | 0 |
| i = 4 | 75% | 1 second | 70% |
| i = 5 | 75% | 2 seconds | 70% |
| i = 6 | 80% | 2 seconds | 70% |

Referring again to FIG. 3, following the end of the trial run at step 134 technique 96 determines whether the trial run achieved a successful start at step 208. A successful start may be determined to have occurred 210 if the back emf of the motor is above a threshold value or the motor has reached final speed. The motor can subsequently start successfully based on the operating parameters of the trial run, and an over-current and/or over-temperature condition did not occur during the trial run. Final speed may be detected by a drop in notch depth voltage (measured as a voltage across the soft starter switching devices), a drop in current below a threshold, a peak or inflexion in the torque profile, or a combination of the three, according to various embodiments.

A peak torque typically occurs in induction machines shortly before final speed is reached, and, as such, is an early indicator of the system being about to reach final speed. The detection of the peak torque is determined as a function of nominal torque, such as, for example, nominal torque multiplied by a scalar coefficient. According to one embodiment, technique 96 may be configured to determine a torque estimate to sense whether the motor is approaching full speed. Estimating the torque provides additional information for use in tuning the notch function, including an early indication that the motor will reach final speed based on a current notch function. To determine the torque estimate, the motor stator resistance is obtained using one of a number of methods. For example, the motor stator resistance may be obtained from the motor manufacturer, measured separately off-line, or estimated using a known technique. Alternatively, the motor stator resistance may be estimated by turning two thyristors on in two of the motor phases when the motor is at a standstill. As the voltage across these two phases is close to zero and decreasing, turning the thyristors on produces a short current waveform in these two phases. The voltage and current are measured during this conduction to provide the desired stator winding resistance value. The stator winding resistance value, $R_s$, is then used to calculate the stator flux vector, $\Psi_s$, according to:

$$\Psi_s = \int (u_s - R_s i_s) dt \quad \text{(Eqn. 1)},$$

where $u_s$ are the measured stator voltages, $i_s$ are the measured stator currents applied to the motor. The electromagnetic torque, $T_e$, may then be estimated according to:

$$T_e = p_n (i_{s\beta} \Psi_{s\alpha} - i_{s\alpha} \Psi_{s\beta}) \quad \text{(Eqn. 2)},$$

where $p_n$ is the number of pole pairs and the subscripts $\alpha$ and $\beta$ reflect components on two axes in quadrature, such as d-q axes.

If technique 96 determines at step 208 the trial run did not result in a successful start 212, technique 96 returns to step 114 to start a subsequent trial run. During the subsequent trial run, the switching devices of the soft starter are controlled according to a motor start-up profile defined by one or more updated operating parameters (e.g., ramp time and/or initial torque factor) determined from the no start tuning subroutine 132 and/or the current/temperature trip tuning subroutine 130 run during the previous trial run.

Technique 96 continues to modify the operating parameters for the motor start-up profile or notch width function during subroutines 130 and 132 during a given trial run and use those modified values to define an updated notch width function for operating the soft starter during the next trial run until a successful start is determined at step 208 or until one of subroutines 130 or 132 outputs a flag. A flag may be indicated from still not reaching full speed even with the highest possible value of initial torque (for example condition "trial run i=6" in Table 1), or from other indicators such as having exceeded a predetermined maximum number of attempted starts. Along with the indication of a flag, technique 96 may make information available to the user or to other algorithms concerning the start attempt, to help in providing a diagnosis, identifying a fault condition, if any, and enabling a path to achieve successful system starts in the future.

When a successful start is determined to have occurred during the trial run 210 and the user provided a desired start time at step 110, technique 96 continues to the final stage of the automated tuning technique wherein the operating parameters may be adjusted to achieve a smooth run with less strain on the load and/or achieve a motor start-up within a time period closer to the user desired start time, t_user_start. To do this, technique 96 determines the actual time it took for the motor to start during the trial run (referred to herein as t_start) at step 214. Technique 96 then initiates a ramp time tuning subroutine 216, described in detail with respect to FIG. 9.

Figure 9:
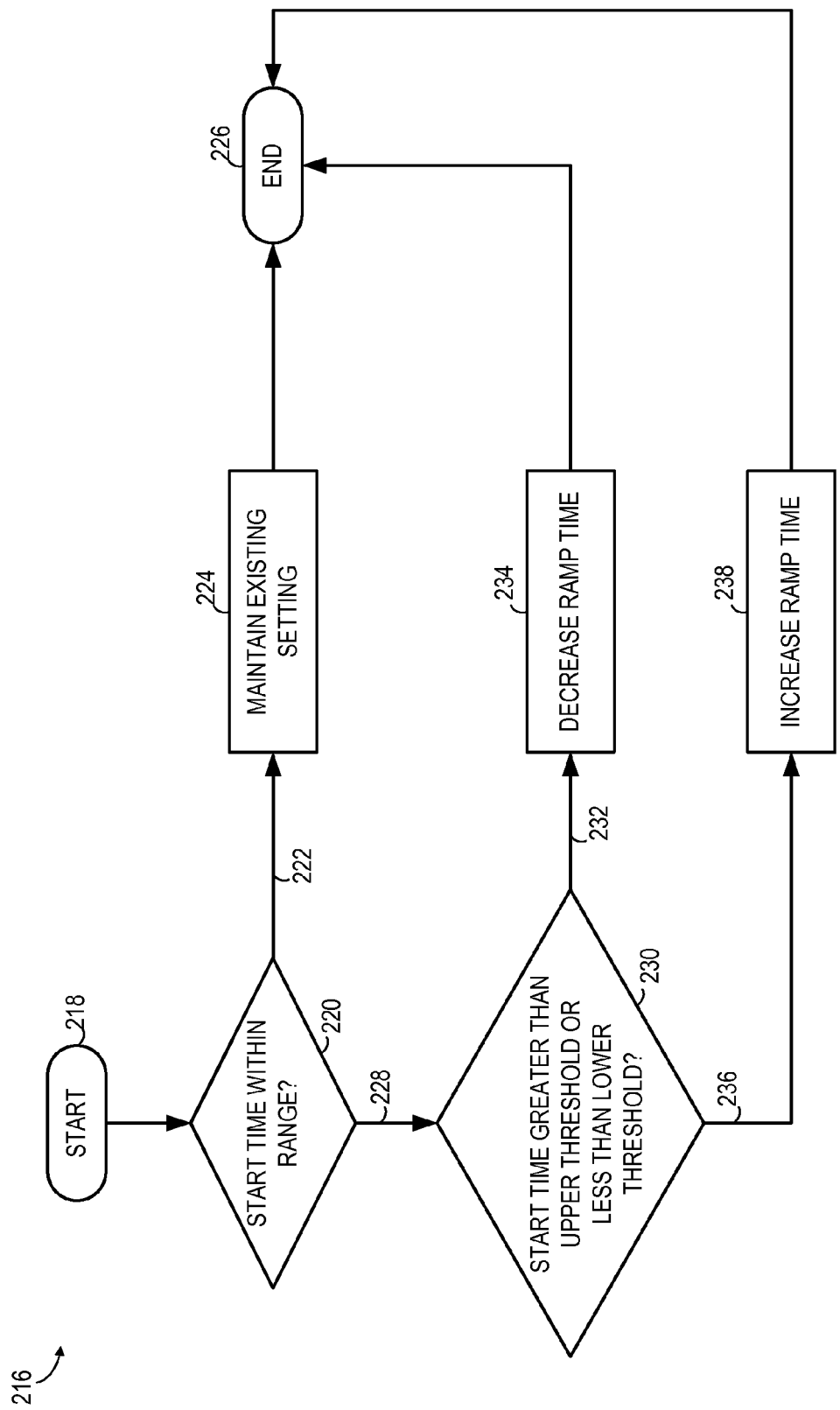
FIG. 9 is a flowchart illustrating a subroutine of the technique of FIG. 3 that tunes a ramp time of a notch width function based on an actual start time of a motor, according to an embodiment of the invention.

Referring now to FIG. 9, the sub-steps of start time tuning subroutine 216 are illustrated according to one embodiment of the invention. Subroutine 216 selectively adjusts the present value of the ramp time, t_ramp, so that the time it takes the motor to reach final speed is closer to the user desired star time, t_user_start. Because an actual start may only occur within a limited range of time values, subroutine 216 is configured to make small adjustments to the start time and, in one embodiment, only adjust the ramp time, t_ramp, a single time. In the event an overcurrent occurs during the subsequent trial run as a result of the updated ramp time, technique 96 reverts to the ramp time used in the previous trial run for subsequent motor starts.

Subroutine 216 begins at step 218 and determines whether the actual start time, t_start, is within a given range of the user input start time at step 220, where the given range is defined between an upper threshold and a lower threshold. As one example, the given range may be defined between an upper threshold of approximately 120 percent of the user input start time and a lower threshold of approximately 80 percent of the user input start time. However, the upper and lower threshold values may be varied in alterative embodiments. If subroutine 216 determines that the actual start time is within the predefined time range 222, subroutine 216 maintains the existing ramp time setting for the subsequent trial run at step 224 and ends at step 226.

If, on the other hand, the actual start time is not within the predefined range 228, subroutine 216 determines whether the actual start time is greater than the upper threshold of the predefined range or less than the lower threshold of the predefined range at step 230. If the actual start time is greater than the upper threshold 232, subroutine 216 decreases the ramp time, t_ramp, for the next trial run at step 234. If the actual start time is less than the lower threshold of the predefined range 236, subroutine 216 increases the ramp time, t_ramp, for the next trial run at step 238. According to various embodiments, subroutine 216 increases or decreases the ramp time, t_ramp, at steps 234 and 238 according to a predefined function. Following steps 234 or 238 the subroutine ends at step 226.

Referring again to FIG. 3, technique 96 ends at step 240 and the operating parameters defined during subroutines 130, 132 (and subroutine 216 if applicable) are stored for use in the next motor start. During continued operation of soft starter, the controller continues to run the auto-tuning algorithm described herein and continuously tune the operating parameters of the notch width profile used to operate the soft starter.

Further, technique 96 can be integrated within, or integrate within its steps, a number of other algorithms and functions, such as diagnostic functions, protection functions, current limiting functions, energy monitoring functions, and the like, that technique 96 can work cooperatively with, or enhance by such methods and steps as information exchange and the like. As such technique 96 may be embedded within, or encompass, a larger or much larger soft starter control system.

A technical contribution for the disclosed method and apparatus is that it provides for a controller-implemented technique for generating and tuning the operating parameters that define the notch width profile operating a motor soft starter. The technique defines a first notch width profile, monitors operating conditions during an initial motor start attempt operated according to the first notch width profile, and automatically updates one or more parameters of the notch width profile. Accordingly, the technique disclosed herein automatically defines the operating parameters for a soft starter with minimal user input and, in some embodiments, absent any user input. Since the disclosed technique automatically recalculates and adjusts the motor start-up function used to operate the soft starter over time, the technique increases the probability of a smooth motor start and accounts for load changes over time.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Therefore, according to one embodiment of the invention, a motor control device that is electrically connectable to an AC motor includes a plurality of switching devices comprising at least one switch corresponding to a respective phase of the AC motor and a controller. The controller is programmed to define a motor start-up function based on a rated current of the AC motor, the motor start-up function comprising an initial torque factor and an initial ramp time, and trigger the plurality of switching devices according to the motor start-up function to inject current into the AC motor during a first trial run. The controller is also programmed to monitor operating conditions of at least one of the AC motor and the motor control device during the first trial run, modify the motor start-up function based on the monitored operating conditions, and trigger the plurality of switching devices according to the modified motor start-up function to inject current into the AC motor during a subsequent trial run.

According to another embodiment of the invention, a method for controlling a AC motor includes providing a motor control device having a plurality of switching devices to condition voltage and current to the AC motor, providing a sensor system to sense operating conditions of the motor control device and the AC motor, and coupling the motor control device between an AC power source and the AC motor. The method also includes automatically generating a first notch width function from an initial set of operating parameters, controlling the plurality of switching devices according to the first notch width function during a first motor start-up attempt, automatically modifying the first notch width function based on feedback received from the sensor system during the first motor start-up attempt, and controlling the plurality of switching devices according to the modified notch width function during a second motor start-up attempt.

According to yet another embodiment of the invention, a soft-starter is provided to control transmission of voltage and current from an AC power source to an induction motor. The soft-starter includes a plurality of supply lines, each supply line corresponding to a phase in the induction motor and a plurality of solid-state switches comprising at least one solid-state switch located on each of the plurality of supply lines to condition a motor line voltage and a phase current to the induction motor. The soft-starter also includes a processor programmed to trigger the plurality of solid-state switches according to a motor start-up function and automatically modify at least one operating parameter of the motor start-up function absent operator input. The processor is further programmed to automatically update the motor start-up function using the modified at least one operating parameter and trigger the plurality of solid-state switches according to the updated motor start-up function.

Embodiments of the present invention have been described in terms of the preferred embodiment, and it is recognized that equivalents, alternatives, and modifications, aside from those expressly stated, are possible and within the scope of the appending claims.

What is claimed is:

1. A motor control device electrically connectable to an AC motor, the motor control device comprising:
   a plurality of switching devices comprising at least one switch corresponding to a respective phase of the AC motor; and
   a controller programmed to:
      define a motor start-up function based on a rated current of the AC motor, the motor start-up function comprising an initial torque factor and an initial ramp time;
      trigger the plurality of switching devices according to the motor start-up function to inject current into the AC motor during a first trial run;
      monitor operating conditions of at least one of the AC motor and the motor control device during the first trial run;
      modify the motor start-up function based on the monitored operating conditions; and
      trigger the plurality of switching devices according to the modified motor start-up function to inject current into the AC motor during a subsequent trial run.

2. The motor control device of claim 1 wherein the controller is further programmed to define and modify the motor start-up function absent operator input.

3. The motor control device of claim 1 wherein the controller is further programmed to:
   trigger the plurality of switching devices according to the motor start-up function for a predefined duration;

discontinue triggering the plurality of switching devices to disconnect the AC motor from the AC power source if the AC motor has not reached full speed at the end of the predefined duration;
monitor a voltage of the AC motor at the end of the predefined duration; and
modify the motor start-up function by increasing the initial torque factor if the monitored voltage is below a threshold.

4. The motor control device of claim 1 wherein the controller is further programmed to:
receive feedback from a current sensor during the first trial run;
identify a current trip based on the received feedback; and
modify the motor start-up function by increasing the initial ramp time if the current trip is identified.

5. The motor control device of claim 1 wherein the controller is further programmed to:
identify a current trip during the first trial run;
modify the motor start-up function by decreasing the initial torque factor if the identified current trip occurs before a first time threshold in the first trial run; and
modify the motor start-up function by increasing the initial ramp time if the identified current trip occurs after the first time threshold.

6. The motor control device of claim 1 wherein the controller is further programmed to:
determine whether the AC motor reached full speed during the first trial run; and
if the AC motor reached full speed during the first trial run:
determine an actual start time for the AC motor;
compare the actual start time to the initial ramp time; and
modify the motor start-up function by selectively adjusting the the initial ramp time based on the comparison.

7. The motor control device of claim 1 wherein the controller is further programmed to modify the motor start-up function by defining at least one of an initial kick-start torque factor and a kick-start duration.

8. The motor control device of claim 1 wherein the controller is further programmed to modify the motor start-up function by adjusting at least one of the initial torque factor and the initial ramp time based on a look-up table.

9. The motor control device of claim 1 wherein the initial torque factor and the initial ramp time are defined by a notch width profile.

10. A method for controlling an AC motor comprising:
providing a motor control device having a plurality of switching devices to condition voltage and current to the AC motor;
providing a sensor system to sense operating conditions of the motor control device and the AC motor;
coupling the motor control device between an AC power source and the AC motor;
automatically generating a first notch width function from an initial set of operating parameters;
controlling the plurality of switching devices according to the first notch width function during a first motor start-up attempt;
automatically modifying the first notch width function based on feedback received from the sensor system during the first motor start-up attempt; and
controlling the plurality of switching devices according to the modified notch width function during a second motor start-up attempt.

11. The method of claim 10 wherein modifying the first notch width function comprises at least one of modifying a ramp time of the first notch width function and modifying an initial torque factor of the first notch width function.

12. The method of claim 10 further comprising:
detecting an overcurrent condition during the first motor start-up attempt; and
automatically modifying the first notch width function by extending a ramp time of the first notch width function based on the detected overcurrent condition.

13. The method of claim 10 further comprising:
detecting an overcurrent condition during the first motor start-up attempt; and
automatically modifying the first notch width function by reducing an initial torque factor of the first notch width function.

14. The method of claim 10 further comprising automatically modifying the first notch width function to include a kick-start duration and an initial kick-start torque factor.

15. The method of claim 10 further comprising:
determining if the AC motor reached a final speed during the first trial run; and
if the AC motor did not reach the final speed, automatically modifying the first notch width function by increasing an initial torque factor of the first notch width function.

16. A soft-starter to control transmission of voltage and current from an AC power source to an induction motor, the soft-starter comprising:
a plurality of supply lines, each supply line corresponding to a phase in the induction motor;
a plurality of solid-state switches comprising at least one solid-state switch located on each of the plurality of supply lines to condition a motor line voltage and a phase current to the induction motor;
a sensor system configured to monitor at least one of a current and a voltage of the plurality of supply lines; and
a processor programmed to:
trigger the plurality of solid-state switches according to a motor start-up function;
receive feedback from the sensor system;
automatically modify at least one operating parameter of the motor start-up function absent operator input based on the received feedback;
automatically update the motor start-up function using the modified at least one operating parameter; and
trigger the plurality of solid-state switches according to the updated motor start-up function.

17. The soft-starter of claim 16 wherein the processor is further programmed to: detect a current trip; identify a time that the detected current trip occurred; and if the time is above a threshold, extend a ramp time of the motor start-up function based on the detected current trip; and if the time is below the threshold, reduce an initial torque factor of the motor-start-up function based on the detected current trip.

18. The soft-starter of claim 17 wherein the processor is further programmed to extend the ramp time of the motor start-up function based on the detected current trip if the time is below the threshold.

19. The soft-starter of claim 17 wherein the processor is further programmed to reduce an initial torque factor of the motor start-up function based on the detected current trip.

20. The soft-starter of claim 16 wherein the processor is further programmed to automatically update the motor start-up function to include a kick-start duration and an initial kick-start torque factor.

21. The soft-starter of claim 16 wherein the processor is further programmed to define the motor start-up function based on a rated current of the induction motor.

22. The soft-starter of claim 16 wherein the processor is further programmed to:
- trigger the plurality of solid state switches according to the motor start-up function for a predetermined duration;
- estimate a speed of the induction motor at the end of the predetermined duration;
- trigger the plurality of solid state switches according to the motor start-up function during a subsequent motor start if the estimated speed is greater than a threshold; and
- trigger the plurality of solid state switches according to the updated motor start-up function during the subsequent motor start if the estimated speed is less than the threshold.

\* \* \* \* \*